United States Patent
Hopper

(10) Patent No.: US 7,314,559 B2
(45) Date of Patent: Jan. 1, 2008

(54) SEPARATOR

(75) Inventor: Hans Paul Hopper, Aberdeen (GB)

(73) Assignee: Cameron International Corporation, Houston, TX (US)

( * ) Notice: Subject to any disclaimer, the term of this patent is extended or adjusted under 35 U.S.C. 154(b) by 544 days.

(21) Appl. No.: 10/510,554

(22) PCT Filed: Mar. 24, 2003

(86) PCT No.: PCT/GB03/01253

§ 371 (c)(1),
(2), (4) Date: Oct. 7, 2004

(87) PCT Pub. No.: WO03/086570

PCT Pub. Date: Oct. 23, 2003

(65) Prior Publication Data

US 2005/0150827 A1   Jul. 14, 2005

(30) Foreign Application Priority Data

Apr. 8, 2002   (EP) .................................. 02252502

(51) Int. Cl.
*B01D 17/038* (2006.01)
*B01D 21/26* (2006.01)
(52) U.S. Cl. .................. 210/512.1; 210/788; 209/722; 209/723; 209/725; 55/459.1
(58) Field of Classification Search .............. 210/512, 210/1, 788; 209/722, 723, 725; 55/459.1
See application file for complete search history.

(56) References Cited

U.S. PATENT DOCUMENTS

| | | | |
|---|---|---|---|
| 2,468,070 A | * | 4/1949 | Hunter ................. 210/512.1 |
| 3,346,117 A | * | 10/1967 | Page, Jr. ................. 210/512.1 |
| 3,543,846 A | | 12/1970 | Smith |
| 3,545,215 A | | 12/1970 | Burrus |
| 4,175,039 A | | 11/1979 | Fisher |
| 4,438,817 A | | 3/1984 | Pokladnik et al. |
| 4,527,632 A | | 7/1985 | Chaudot |
| 4,955,436 A | | 9/1990 | Johnston |
| 5,004,051 A | | 4/1991 | Rosendahl et al. |
| 5,004,552 A | * | 4/1991 | Al-Yazdi ................. 210/512.1 |
| 5,154,741 A | | 10/1992 | da Costa Filho |

(Continued)

FOREIGN PATENT DOCUMENTS

GB   2255102   10/1992

(Continued)

OTHER PUBLICATIONS

EP Examination Report dated Jun. 21, 2006 for Appln. No. 03 256 021.1 (pp. 4).

(Continued)

*Primary Examiner*—David A Reifsnyder
(74) *Attorney, Agent, or Firm*—Conley Rose, P.C.

(57) ABSTRACT

A separator for separating multiphase flow, the separator comprising: an inlet for multiphase fluid; a plurality of outlets at least one for each selected separator phase; and a main annular tubular bore through which the multiphase flow is caused to flow and to separate into lighter and heavier fluids, the bore having an outlet for each of the lighter and heavier fluids.

17 Claims, 7 Drawing Sheets

U.S. PATENT DOCUMENTS

| | | | |
|---|---|---|---|
| 5,248,421 A * | 9/1993 | Robertson | 210/512.1 |
| 5,431,228 A | 7/1995 | Weingarten et al. | |
| 6,062,313 A | 5/2000 | Moore | |
| 6,068,053 A | 5/2000 | Shaw | |
| 6,129,152 A | 10/2000 | Hosie et al. | |
| 6,197,095 B1 | 3/2001 | Ditria et al. | |
| 6,216,799 B1 | 4/2001 | Gonzalez | |
| 6,269,880 B1 | 8/2001 | Landry | |
| 6,276,455 B1 | 8/2001 | Gonzalez | |
| 6,325,159 B1 | 12/2001 | Peterman et al. | |
| 6,328,118 B1 | 12/2001 | Karigan et al. | |
| 6,527,054 B1 | 3/2003 | Fincher et al. | |
| 6,569,323 B1 * | 5/2003 | Pribytkov | 210/512.1 |
| 6,578,637 B1 | 6/2003 | Maus et al. | |
| 6,640,901 B1 | 11/2003 | Appleford et al. | |
| 6,651,745 B1 | 11/2003 | Lush et al. | |
| 6,773,605 B2 | 8/2004 | Nyborg et al. | |
| 6,989,103 B2 | 1/2006 | Mohsen et al. | |
| 7,013,978 B2 | 3/2006 | Appleford et al. | |
| 2002/0007968 A1 | 1/2002 | Gardes | |
| 2003/0062198 A1 | 4/2003 | Gardes | |
| 2003/0168391 A1 | 9/2003 | Tveiten | |
| 2004/0031622 A1 | 2/2004 | Butler et al. | |
| 2004/0099422 A1 | 5/2004 | Lush et al. | |
| 2004/0251030 A1 | 12/2004 | Appleford et al. | |

FOREIGN PATENT DOCUMENTS

| | | |
|---|---|---|
| WO | WO92/14030 | 8/1992 |
| WO | WO01/20128 | 3/2001 |
| WO | WO/02/088519 | 11/2002 |
| WO | WO/03023181 | 3/2003 |
| WO | WO03/033868 | 4/2003 |
| WO | WO03/033871 | 4/2003 |
| WO | WO/03078793 | 9/2003 |

OTHER PUBLICATIONS

Office Action dated Aug. 3, 2005 for U.S. Appl. No. 10/940,380 (pp. 12).

Final Office Action dated Dec. 29, 2005 for U.S. Appl. No. 10/940,380 (pp. 12).

Office Action dated Jul. 25, 2006 for U.S. Appl. No. 10/940,380 (pp. 13).

Final Office Action dated Dec. 6, 2006 for U.S. Appl. No. 10/940,380 (pp. 11).

Office Action dated Aug. 8, 2005 for U.S. Appl. No. 10/940,140 (pp. 14).

Final Office Action dated Dec. 29, 2005 for U.S. Appl. No. 10/940,140 (pp. 11).

* cited by examiner

SEPARATOR

CROSS REFERENCE TO RELATED APPLICATIONS

This application is a National Phase entry of PCT Application No. PCT/GB03/01253 filed 24 Mar. 2003 which claims priority to EP Application No. 02252502.6 filed 8 Apr. 2002, both of which are incorporated herein by reference, and is related to U.S. application Ser. No. 10/940,380 filed Sep. 14, 2004 and U.S. application Ser. No. 10/940,140 filed Sep. 14, 2004, now U.S. Pat. No. 7,134,498.

BACKGROUND OF THE INVENTION

This invention relates to a separator for separating multiphase flow and, in particular, a separator which can be utilised as part of the subsea assembly described in our co-pending European patent application entitled "Subsea Process Assembly" and filed on the same day (agent's ref: MJBO7O59EP), both hereby incorporated herein by reference.

In general, the current practice for development of subsea hydrocarbon fields is on a macro field approach which uses a plurality of subsea wells connected through a subsea infrastructure, pipelines and risers to a surface process facility, such as a floating production vessel or a platform. In many locations, especially in remote areas, the proportion of gas and water within the fluid produced by the well is significant and is generally a surplus product, when compared to the oil which it is usually desired to retrieve. The gas and water has to be safely and cleanly disposed of in a manner which does not damage the environment.

A solution for such a system is that gas and water which have been taken out of the well and which are separated at the surface can be pumped back to the seabed to be reinjected at the seabed into subsea wells. This re-injection reduces the rate of decline of the reservoir pressure allowing the field to produce for longer. To increase the rate of production, energy must be supplied to the production stream using either downhole or seabed methods.

Overall, the current approach requires a complex field production system which has numerous pipelines, thus incurring a high field capital expenditure and operational expenditure. This high expenditure reduces the commercial ceiling at which the field can be operated viably. As the field matures and production declines, a level is reached at which considerable resources are left in place but at which it is no longer commercially viable to operate the wells.

Conventionally, the flow which is achieved from a subsea well is directed to a surface production vessel. Back pressure on the well reduces the production rate and brings on an early decline of the wells flowing life as the reservoir pressure at the bottom of the well must overcome the hydrostatic head and the pressure caused by friction. Therefore the well depth, the distance along the seabed and the water depth are all contributing factors against the reservoir pressure. At a certain stage, the well ceases to produce a useable flow when a significant proportion of the desired fluid remains in the reservoir area drained by the well. Energy can be added to the production stream, either downhole, at the wellhead or in the riser. The input of energy increases the lift cost of the oil from the well, thereby reducing the commercial viability of the well and, in some cases, the entire field.

In deep water or for wells at a considerable distance, such as over a number of kilometres from the surface production vessel, the production rate decline or the energy input causes the commercial value of a field to be reduced quicker. The early non-viability of the field means considerable valuable resources such as the non recovered natural resources are left in situ. Accordingly, and especially in deep water, the limited production rates, the early decline and the higher costs result in an increased investment requirement with a lower rate of return. This ensures that small and medium sized fields cannot be exploited fully, if at all, using current practices.

When wells are at a considerable horizontal distance along the seabed from the surface production vessel, a number of significant problems such as slugging, hydrates, waxing and an increased back pressure are caused by the distance that the production fluid must travel. In addition, using gas artificial lift in the well can exacerbate these problems causing pipelines to require higher specifications and larger diameters, thereby increasing the cost.

In order to maximise the production capability of a well, well operators are considering solutions which are based on the macro field approach and these include downhole gas lift or pumping, seabed drive, multiphase pumping, gas/liquid separation, hydrocarbon/water separation, individual well gas/liquid separation and three phase separation.

As the pressure in the reservoir declines and at different rates in different parts of the field, the volume produced from the wells will also decline. To maintain an effective production rate requires the addition of artificial lift in the wells that increases the seabed wellhead flowing pressure. This means that, in pumped wells, a considerable amount of gas will still be in solution at the wellhead.

In a macro field approach, the wells produce flowing up to the subsea trees along to a manifold where the flow from individual wells is commingled and then the multiphase fluid flows to the surface via pipelines and risers. To reduce the back pressure caused by the pipelines, methods for providing energy to the flow stream downstream of the manifold, such as additional pumps, may be used. As the fluid flows up the well the gas will come out of solution once it is above the bubble point, thereby causing a gas/liquid flow at the wellhead. However, such multiphase pumps require additional energy which increases the cost of this approach. The requirements for pumping this free gas are very different and, in many cases, opposite to those required for pumping liquid and therefore there is a design conflict and, at best, only a poor compromise can be achieved. Therefore it is preferable to separate the fluid into gas and liquid which can be directed to suitable gas pumps and liquid pumps. As friction losses along a pipeline reduce the pressure, more and more gas comes out of the liquid solution, possibly forming 50 to 100 metre slugs of gas. It should be considered that this gas does not need pumping due to the low gas friction factor and low gas hydrostatic head, and can freely travel along its own pipeline. It is the liquid slugs that have to be pushed along by the compressed gas. Accordingly, the energy used by a multiphase pump to compress the gas to achieve a pressurised multi phase flow is unnecessary if a separate gas flow line is used.

On the surface, large pressure resistant sealed tanks can be used to provide adequate standing time for the flow to separate into the gas, oil, water and solids slurry phases. To separate fluids at high pressures on the surface, or subsea, or at low pressures in deeper waters requires separators that can withstand burst, collapse or both. Large conventional tanks are no longer suitable and smaller tanks capable of withstanding high internal and/or external pressures have to be used.

The reduced size either reduces the volume throughput or several have to be used considerably increasing the complexity. This outline has covered the conventional approach to subsea separation of wellhead fluids.

Subsea gas/liquid separation and pumping can partially take advantage of the wellhead at the seabed and the water depth. The gas can be separated at a lower pressure than the lowest pressure point in the pumped liquid pipeline. Such a system is described in U.S. Pat. No. 4,900,433 by disclosing a drilling approach using a conventional subsea conductor as a separator housing. Due to the conductor size, a maximum throughput of about 30,000 barrels per day is what can be expected from such a system. The concept disclosed in U.S. Pat. No. 4,900,433 is based on a combination of two principles. A general description of how these principles behave in respect to separation is that, firstly, the fluid is allowed to flow into a large downwardly angled flow trough which allows the fluid velocity to be reduced down to a maximum of 2 to 3 metres per second. The velocity of the fluid down the trough is controlled by the downward angle. In a long straight trough, the length is dependent on the time required to allow the gas to percolate up in respect of the depth of the trough or for oil/water to form a two layered flow. The depth of, and velocity of the fluid in, the trough determines the length of the trough required. Secondly, the trough is now wound around a central core in a helix manner, with the assembly installed into a subsea conductor or it could be part of a seabed silo mounted on the seabed. The fluid in the trough is now subjected to a rotational force which exerts a centrifugal gravitational force on the bubbles or forming droplets.

The trough length can now be shortened as it is inversely proportional to the rotational gravitational effect. As the trough is wound around the central core, a number of rotations can be achieved per metre of hole. The resulting circumference of the circular helix trough means a considerable helix travel distance can be achieved in either the depth of hole or in the silo height.

Although the separation is efficient, the volume throughput is limited by the constraining diameter and the length of the conductor. The height required for a silo could lead to a high profile on the seabed and possible snagging problems.

The principles of separation of fluid are now described. The separation of fluids (gas, oil and water) is a physical operation and occurs naturally if the fluid is left in a uniform state. The rate of separation at a set pressure is given by Stoke's Law which states:

$$S = \frac{cgd^2(p_2 - p_1)}{\mu}$$

Where:
S—terminal velocity or rate of separation
C—constant
g—gravity
d—diameter of droplet
$p_2$—density of surrounding fluid
$p_1$—density of droplet
$\mu$ viscosity of surrounding fluid This shows that the diameter of a droplet, bubble or particle, being squared, is an important factor that defines the rate of separation.

This applies to the free gas bubbles, or droplets of either oil or water in the surrounding fluid. At a certain pressure, a quantity of gas will be in solution which cannot be separated out at this pressure. If the pressure is lowered, more gas will come out of solution. Therefore it is important to operate the separator at a pressure level that will achieve the correct level of gas/liquid separation as defined for the system. The pressure level will not affect the size of solids and only marginally affect the size of liquid droplets.

The two variable but critical factors in the separation process between two fluids of defined density, viscosity and pressure are the diameter of the bubble or droplet and the effect of gravity.

In a large stationary fluid separation tank, taking the effect of gravity on the earth surface as 1 g, only 1 g is applied resulting ma 10-15 minute standing time to achieve a level of separation between different liquids. By rotating the fluid, the g forces can be increased, (e.g. by using a centrifuge the force are increased to 5000 g and using a hydrocyclone to 2000 g).

The centrifugal force created by a rotating item whether a unit mass, droplet, bubble or particle is given by:

$$C_f = \frac{mV^2}{r}$$

Where:
$C_f$—centrifugal force
m—mass of item
V—velocity
r—radius of rotation

This shows that the velocity being squared is a sensitive value to increasing the separation factor for a set radius of rotation. The combination of the radius of curvature and the velocity will define the flow rate through the separator. The volume of the separator is dependent on the time to achieve the desired level of separation of the flow rate.

A separator in which the g forces are high is therefore very efficient, providing the particle or materials being separated remain the same size. (i.e. sand and debris in a liquid).

The main disadvantage of these high g force separators for separating moving liquids in a fixed cyclone or helix compared with a stationary fluid in a centrifuge is the high shear stress forces which results in breaking down the droplet size, causing smaller droplets, even creating emulsions. To either reduce the effect of emulsions or to rectify the problem, chemical additives can be used. Therefore the advantage of a higher gravity force is overshadowed by the drastically reduced droplet diameter because the separation force is dependent on the square of the droplet diameter.

A gradual reduction of droplet diameter in a moving fluid occurs down to 20 g, but above this value a large reduction in droplet diameter occurs with the effect that higher gravity forces now only causes a minor increase in the rate of separation.

It is therefore critical to keep the droplet diameters as large as possible by creating a gravity effect between 10-20 g and by keeping the velocity of the fluid between a maximum of 2-3 m/s.

BRIEF SUMMARY OF THE PREFERRED EMBODIMENTS

The present invention aims to overcome the problems associated with the prior art and to provide a separator which can quickly and efficiently separate multiphase flow into the individual component flows.

According to the present invention, there is provided a separator for separating multiphase fluid, the separator comprising:

an inlet for a multiphase fluid;
a plurality of outlets, at least one for each selected separated phase;
a main annular tubular bore through which the multiphase fluid is caused to flow and to separate into lighter and heavier fluids, the bore having an outlet for each of the lighter and heavier fluids.

Thus, the present invention provides a rotational path through which the multiphase fluid is caused to flow and allows a large volume flow path to be achieved without requiring a large separation vessel. The separator of the present invention can be provided in a low snag resistant module and does not require a drilling installation operation.

Preferably, the inlet is a tangential entry, thereby causing the fluid to circulate through the main bore.

Preferably, the flow area of the main bore diameter is at least twice the flow area of the inlet bore to allow a stable rotating flow to establish.

Preferably, the heavier fluid outlet is tangential to the main bore, in the direction of the flow and from a lower, outer section of the main bore.

Preferably, the lighter fluid outlet is tangential to the main bore, in the direction of the flow and from an upper, inner section of the main bore.

Preferably, the separator further comprises a first additional tubular bore located below, and in fluid communication with, the heavier fluid outlet, the first additional bore causing further separation of the flow into lighter and heavier fluids and having an outlet for each of the lighter and heavier fluids.

Preferably, the separator further comprises a second additional tubular bore located above, and tangentially in fluid communication with, the lighter fluid outlet, the second additional bore causing further separation of the flow into lighter and heavier fluids and having an outlet for each of the lighter and heavier fluids.

Preferably, the inlet into the additional bore is tangential.

Preferably, the separator further comprises a spiral conduit connected to at least one of the outlets, the conduit(s) having a smaller flow diameter than any of the annular tubular bores, thereby increasing the fluid velocity to enable further separation of the fluids into the desired phases.

Preferably, the spiral conduit is s parallel sided, spiral coil having the same coil diameter as the spiral coil above to allow the flow to stablise.

Preferably, each conduit defines an envelope, at least part of the envelope being tapered such that the diameters of consecutive loops of the conduit are reduced.

Preferably, the bore diameter of the conduit is reduced in the direction of flow therethrough.

Preferably, the angle of slope of the pipework in the coil of the spiral relative to the annular bore(s) increases as the fluid flows through the conduit to control from each conduit into a tubular bore.

Preferably, the separator further comprises one or more outlets from the spiral to allow for the further separation of lighter and heavier fluids.

Preferably, the separator further comprises one or more drain and/or vent conduits from each conduit into a tubular bore.

Preferably, the drain and/or vent conduits exit the conduit(s) tangentially and in the direction of flow to collect the required phase.

Preferably, the separator further comprises an outlet for solid slurry.

Preferably, the annular tubular bore(s) is(are) circular.

BRIEF DESCRIPTION OF THE DRAWINGS

Examples of the present invention will now be described with reference to the accompanying drawings, in which.

DETAILED DESCRIPTION OF THE PREFERRED EMBODIMENTS

Figure 1:
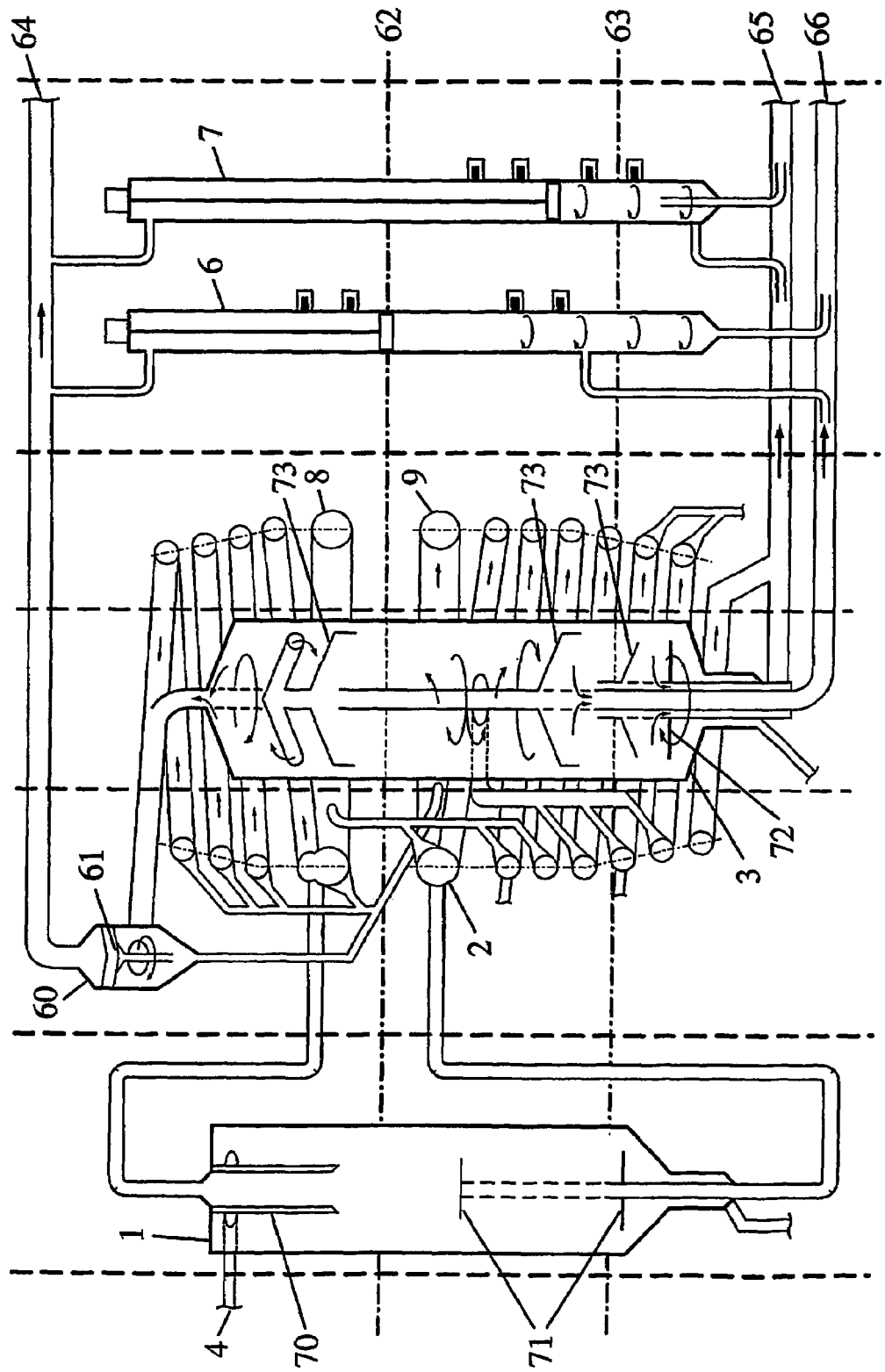
FIG. 1 is a schematic cross sectional view showing a system in which the separator of the present invention could be used.

The multistage separator shown in FIG. 1, and described within our co-pending European patent application filed on the same day (agents ref: MJBO7O59EP) has a gas liquid phase divider 1, a toroidal separator 2 and a vertical separator 3 which can maximise the flow rate and meet the burst and collapsed pressure requirements. All three stages have the ability to remove residual solids which may be in the initial multiphase flow inlet 4. Two level sensors 6, 7 offer a simple dual level sensing method to aid control of the separation process by ensuring that acceptable levels of the individual phases of gas, oil and water can be achieved throughout the separation.

The gas liquid phase divider 1 is provided with a vortex mantel 70 and a vortex breaker 71. The vertical separator 3 is provided with a vortex ring 72 and a number of vortex plates or shrouds 73. The purpose of each of these items is to prevent coning from occurring or a vortex from being formed. This occurs when a fluid has separated into two clear phases, either into different layers in a "standing" or plug flow environment or into cylindrical or conical boundaries in a rotating environment. In this case, there is a tendency when one phase is drawn off for a low pressure area to be created. As this pressure differential increases, the boundary layer between the two phases is drawn down or up and a break though is likely to occur and such an occurrence is undesirable.

Although the second stage toroidal separator 2 of FIG. 1 is shown having a pair of annular bores 8, 9, the present invention can equally be used when only a single annular bore is used or, even, when three or more annular bores are used.

Figure 2:
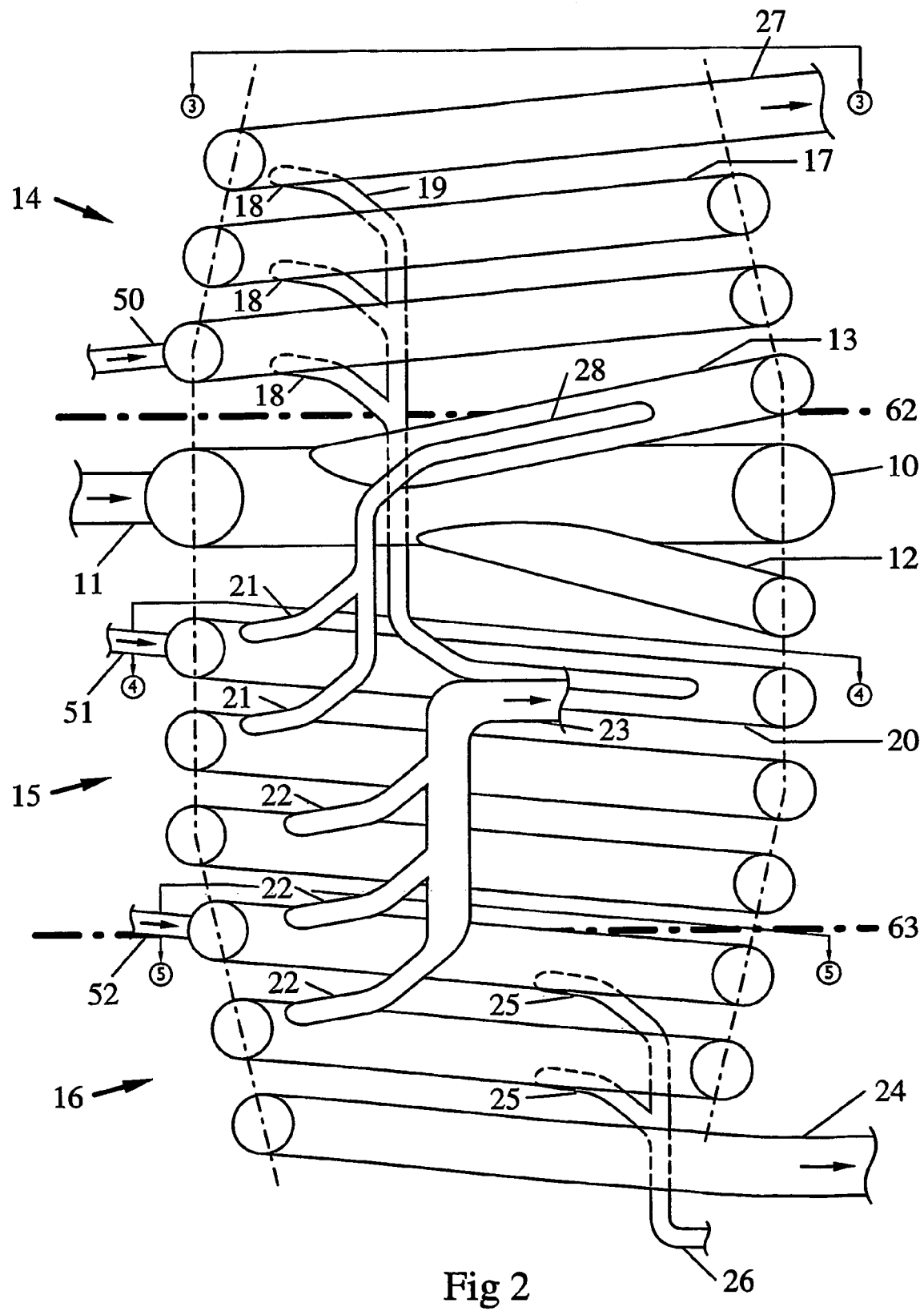
FIG. 2 is a longitudinal cross sectional view through one example of the present invention.

An example of the present invention utilising a single annular multiphase bore is shown in FIG. 2 in which a tubular bore, which can handle the flow rate, burst, collapse pressures, is in the shape of a horizontal ring and is provided for receiving multiphase flow through inlet 11. The diameter of the bore is dependent upon the flow rate and burst and collapse pressures, being typically between 300-1000 mm diameter. As the flow enters the bore 10, it is travelling at a high speed in a turbulent manner up to 10 m/s. The multiphase flow enters the bore 10 via a specific design diameter inlet 11 which is preferably tangential and on the outer circumference of the bore 10, thereby causing a jetting action which helps to induce and maintain the velocity of the flow between 2-3 m/s within the bore 10. By using a larger diameter bore 10 than the inlet 11 bore, the actual size being dependent on flow rate and design requirements, this provides a low shear stress area, allowing the fluid to stabilise and the phases to partially coalesce.

The circular flow that is induced in the multiphase fluid causes heavier fluids and any solid particles within the flow to move to the outer circumference of the bore 10, with the lighter fluids on the inner circumference of the bore 10. As the bore 10 is mounted horizontally, gravitational effects pull the heavier fluids towards the lower outer portion of the bore 10 and this results in the lighter fluids moving to the inner upper portion of the bore 10.

Exit lines 12 and 13 are provided for the heavy fluids and lighter fluids respectively. The exit line 12 is tangential to the bottom circumference of the bore 10 and is mounted on the bottom lower portion of the bore 10. The exit line 13 for the lighter fluids is mounted tangentially to the inner upper portion of the bore 10. The location of the outlets is, of course, dependent upon the fluid which it is expected to receive and therefore the location of the connections of the exit lines can be changed without effecting the operation of the invention.

The separator is divided into three interlinking areas, an upper gas section 14, a central multiphase liquid section 15 and a lower water section 16. In this example, the multiphase flow through inlet 11 comprises gas, oil, water and solids and the separation in bore 10 permits wet gas, that is mainly gas but with entrained liquid, to exit through exit line 13. Solids, oil, water and a little entrained gas exits through exit line 12.

The wet gas travels upwardly through gas section 14 by means of a spiral conduit 17. The liquid within the wet gas is forced on to the outer wall of the conduit 17 and collects. At certain points in the outer wall, liquid traps 18 with specific design diameters and corresponding drain piping 19, either individual or common as shown, are provided such that any liquid which has been separated from the gas flow is directed back into the central multiphase liquid section 15.

The multiphase liquid having trapped gas, which exits through exit line 12, passes into the central section 15 and into a spiral conduit 20. As the liquid spirals down the conduit 20, any entrained gas is separated to the inner portion of the bore and is separated off via exit lines 21 with specific design diameters to control the flow relative to the other exit lines and is fed individually or common as shown into the wet gas exit line 13 for further separation in the gas section 14. Further down through the central section 15, it is the oil that moves to the inner upper portion of the conduit 20 and the water separates to the outer lower portion of the conduit 20. In a predominately water based fluid, the oil is collected via exit lines 22 with specific design diameters and fed into a common oil supply line 23.

The further through the spiral conduit 20 that the fluid passes, the greater proportion of the flow is water until, at the lowermost section, the required degree of separation has been reached with the degree of oil having been separated off, leaving water as the main component which is fed out through water supply line 24. The quality of subsea separation has to meet the pump intake and production and/or re-injection specifications and therefore does not need a high degree of phase purity compared with that required for releasing into the environment. If higher levels of separation are required, the phases can be submitted for further separation using a second or third toroidal.

In the lower section 16 of the separator, the lower outer portion of the bore is the region in which the unwanted solids collect and these are removed via drain lines 25 into a solids removal line 26.

The details of the exit lines are described in greater detail with respect to FIGS. 5 to 9.

Figure 3:
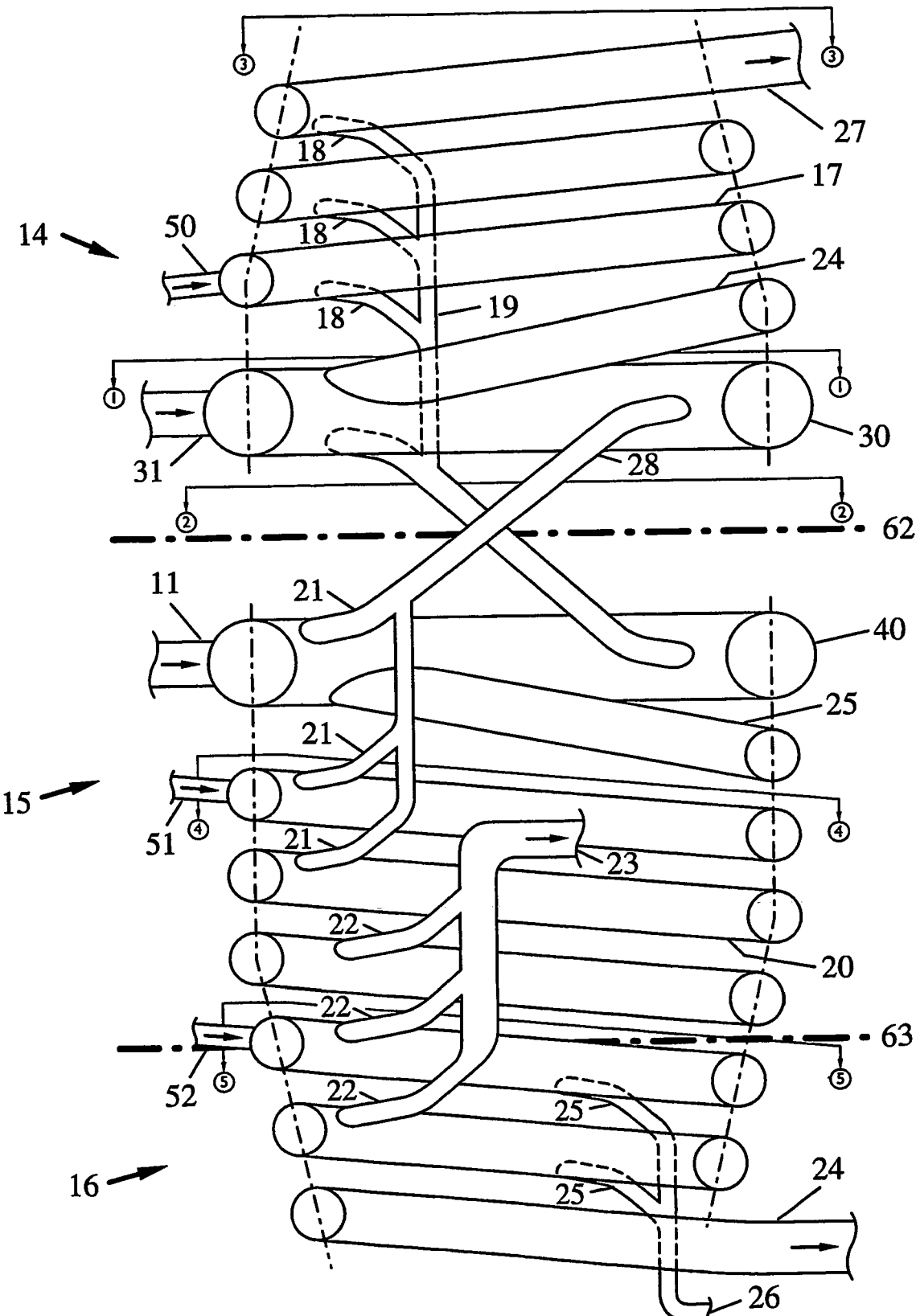
FIG. 3 is a longitudinal cross sectional view through a second example of the present invention.
Figure 4:
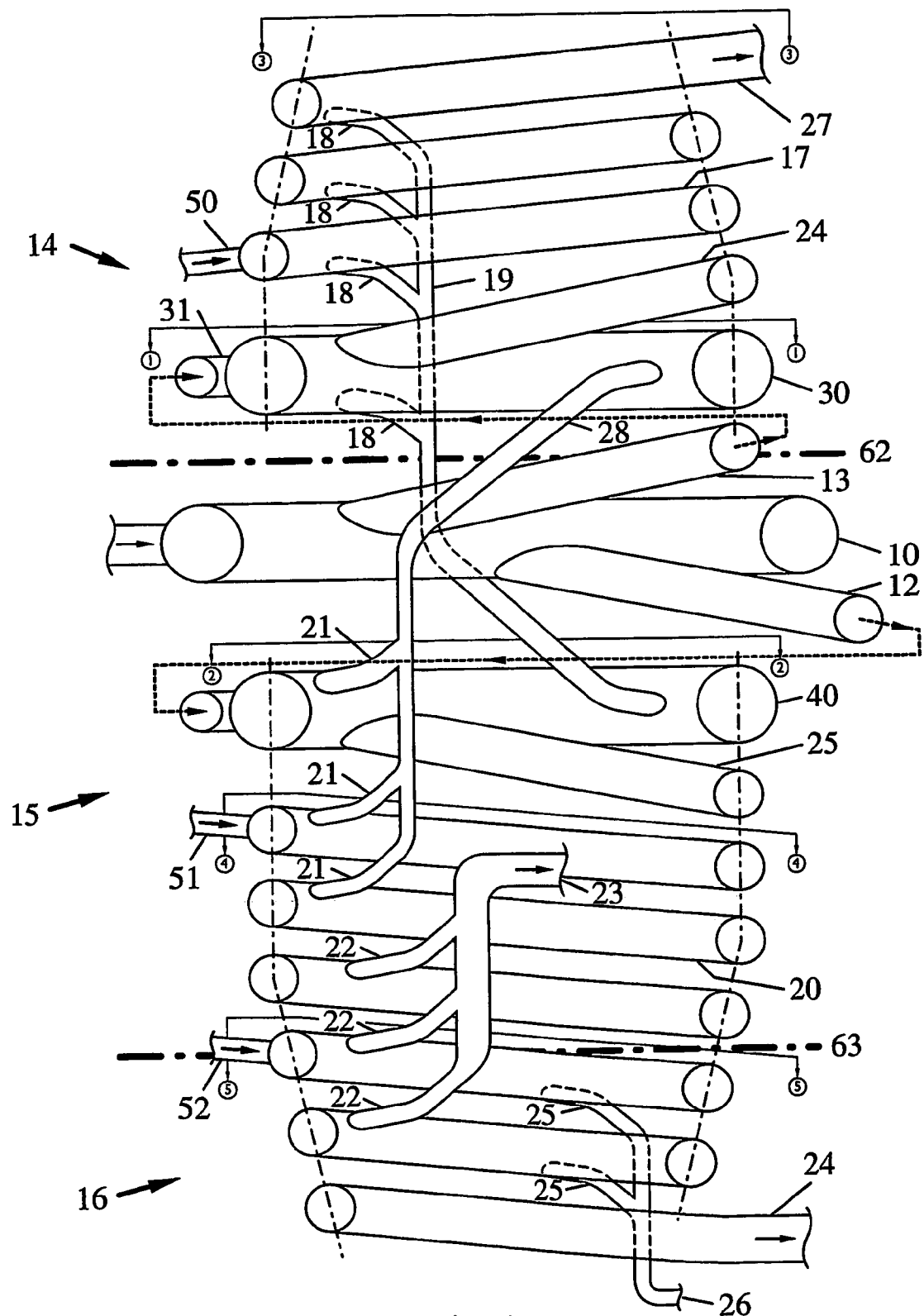
FIG. 4 is a longitudinal cross sectional view through a third example of the present invention.

Further examples of the present invention are shown in FIGS. 3 and 4 and these are, respectively, dual and triple stack systems. In the dual stack system, an additional annular gas bore 30 is utilised when there has been some earlier separation of gas from the multiphase flow equivalent to the multiphase bore 10 such that there is an independent supply 31 of wet gas which requires only the entrained liquid to be separated off. The liquid bore 40 then is supplied with a multiphase flow in which, although the majority of the gas has been removed, a small portion of the gas is still entrained within the liquid and is separated as described with reference to FIG. 2. The oil and water separation is also the same as described before.

The triple stack system shown in FIG. 4, a third annular bore 40 for liquid is provided and this is supplied by exit line 12 from the main multiphase bore 10 and annular bore 30 is supplied by exit line 13 from bore 10. The separation itself is carried out in exactly the same manner as described previously. The triple stack system of FIG. 4 is more likely to be used in situations in which no previous separation of the multiphase fluid has occurred and where larger flow rates are to be accommodated.

In each of the previous three examples, the drain and vent lines with specific design diameters to control the flow relative to the other lines permit the entrained liquid or gas from the gas or liquid flows to be returned to the appropriate section for further separation and, in respect of the gas section 14, the liquid drain flow tubes exit the spiral downwardly at different levels and are connected up to either a single or a common return line as shown that enters the liquid separation section well below the gas/oil level.

Using this approach with specific design diameter lines, any pressure drop in the gas spiral could cause fluid to be drawn up, which will be prevented by the liquid pressure differential effect. This is important to prevent the flow tubes creating a short cut for the gas flow and allowing a gas flow which is not subjected to rotational separation force.

A similar approach applies to the liquid spiral where the gas vent flow tubes must enter the gas separation section well above the gas/oil level. This prevents a liquid from being drawn up against the hydrostatic head.

The phase exit lines for the gas 27 and water 24 from the respective spirals at the top and bottom respectively of the separator, thereby ensuring that a maximum separation distance with them exiting either at the top or bottom of their phase zone. This appears naturally and prevents any accidental carry over of other phases. The oil take off 23 should exit approximately at the mid- to upper section of the oil zone between the gas/oil level and the oil/water level. This again ensures a maximum natural flow, thereby minimising any accidental carry over of water or gas.

In certain circumstances, there maybe a low proportion of a certain phase and therefore, to maintain an efficient flow in the system, it is necessary to reinject fluids. This could be gas, oil or water and these are provided through inlet lines 50, 51 and 52 respectively. The injected flow provides additional energy to the circulating fluids. This is particularly beneficial when there are a significant amount of solids in the separator which require driving through to the solids removal points. During cleaning of the separators, a liquid wash could be injected through the injection lines 50, 51, 52. It may also be necessary to inject certain chemicals, for example to prevent hydrates or to prevent corrosion, and these can also be added to the separator via these injection lines.

In FIGS. 2 and 4, the main multiphase flow enters annular bore 10. FIG. 3 shows a configuration where free gas has already been divided from the main multiphase flow, the removed gas being directed into annular bore 30. In FIGS. 2 and 4, this gas is removed from the annular bore 10 by a wet gas exit line 13 coming off the top and inner portion of bore 10. In FIGS. 2 and 4, liquid exits bore 10 through a tangential bore 12 which is at an angle from the bottom of the bore 10. In FIGS. 3 and 4, the wet gas enters a wet gas annular bore 30.

Figure 5:
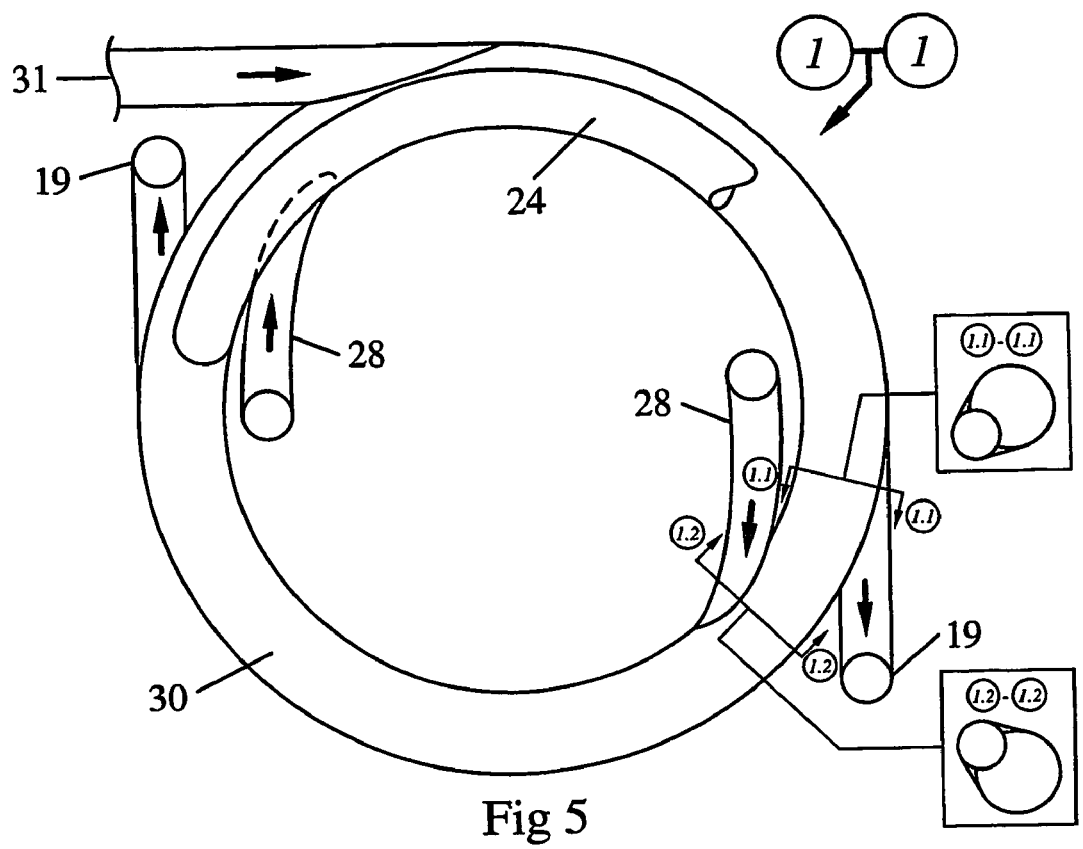
FIG. 5 is a plan view section below line 1-1 in FIGS. 3 and 4.

With reference to the plan view of the annular bore 30 shown in FIG. 5, it can be seen how bore 30 has the gas exit line 24 coming of the top and inner portion of the bore 30. The liquid drain lines 19 are provided coming off tangentially from the bottom outer quarter of the bore 30. The reason for this is the effect of gravity on the liquid flowing around the outer circumference of the bore and the ability to drain off any materials gathering in the bottom of the bore.

The gas vent flow tubes 21 carrying carry over gas from the lower part of the separator with entries 28 upstream of the gas tangential entry. This is shown in FIGS. 3 and 4. A plan view of the main liquid, annular bore 40 of FIGS. 3 and 4 receives primarily liquid, but with some entrained gas, through entry 11 is shown in FIG. 6.

Figure 6:
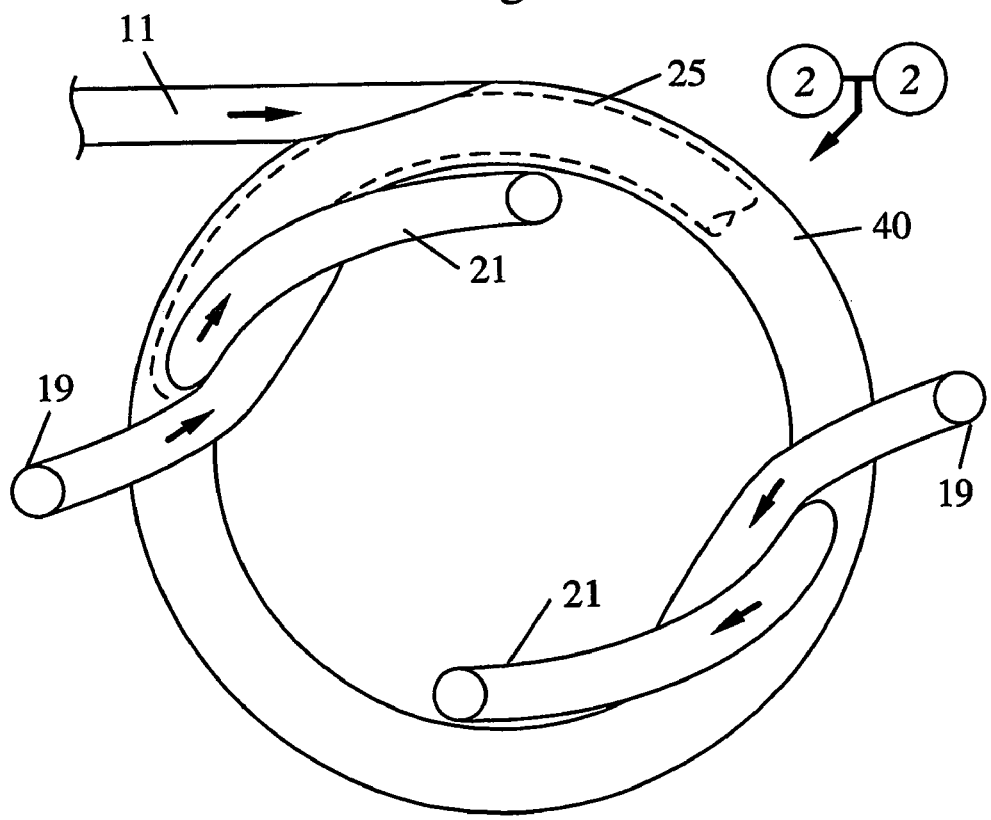
FIG. 6 is a plan view section below the line 2-2 in FIGS. 3 and 4.

FIG. 6 shows a liquid toroidal in which the main liquid exit 25 leaves the bore 40 at an angle from the bottom of the bore. Gas vent lines 21 come off tangentially from the top inner quarter of the ring bore 40. This configuration captures gas in the top of the bore when the rotational velocity is sluggish. When there is a reasonable rotation above 0.5 m/s, the liquid tends to occupy the outer hemisphere of the ring, thereby forcing any gas to the inside circumference of the bore. Return tubes 19 from the gas spiral 14 enter the low pressure zone tangentially at the back of the inside circumference of the toroidal bore 40.

The main exit from either a gas or liquid toroidal is connected to a coiled pipe spiral. The smaller diameter of the spiral causes a velocity increase compared to the velocity in the toroidal bore 30 or 40, thereby increasing the rotational force. A parallel or straight sided coil pipe spiral separation zone 15 is recommended as a section to allow stabilisation of the flow. This allows any carry over of the previously separated off-phase to be removed in vent lines 21.

Figure 7:
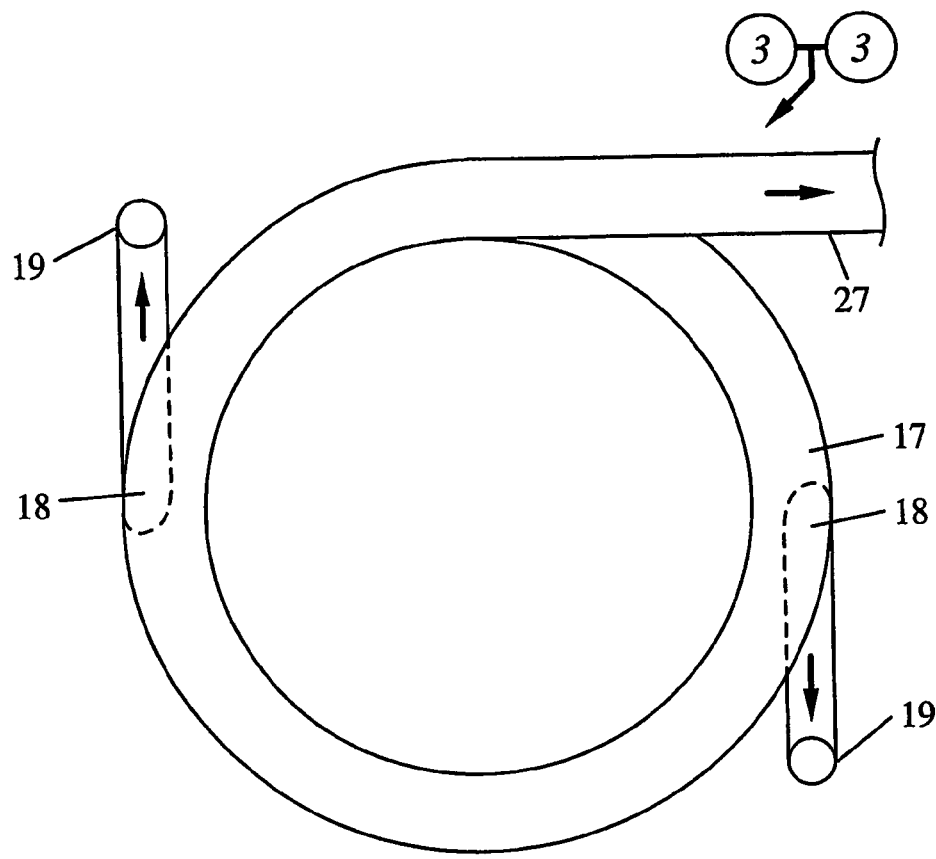
FIG. 7 is a plan view of the upper loop of the spiral conduit, below line 3-3, in FIGS. 2 to 4.

After the straight pipe coil, the coil can taper inwardly as per separation sections 14 and 15 causing a greater rotational force on the remaining fluid. A plan view of the gas spiral is shown in FIG. 7. In a gas spiral, liquid drain pipes 18 are provided tangentially and sloping downwards from the outer bottom segment. These exits capture any liquid flow in the gas spiral bore 17 prior to the gas exit 27 entering the demister baffle plates 61 in demister unit 60 (FIG. 1).

Figure 8:
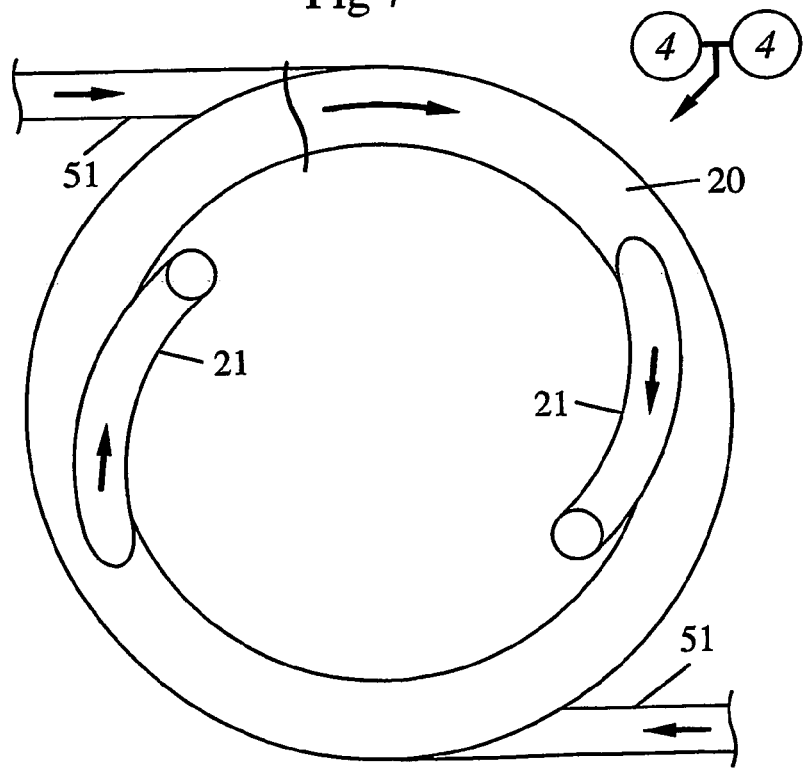
FIG. 8 is a plan view section of the loop of the conduit below the line 4-4 in FIGS. 2 to 4.

FIG. 8 is a plan view section of the liquid spiral. In the parallel section of the liquid spiral, gas vent flow tubes exit 21 tangentially and sloping upwards from the inside top quarter of the bore 20. For separating out different liquids, the tapered coiled pipe section of separation zone 16 should be configured with a preference for the prime bulk liquid. For a predominantly water base flow, the water continues to flow down in the spiral 20 with oil also flowing down and forming in the upper inner quadrant of the water spiral bore 20.

Figure 9:
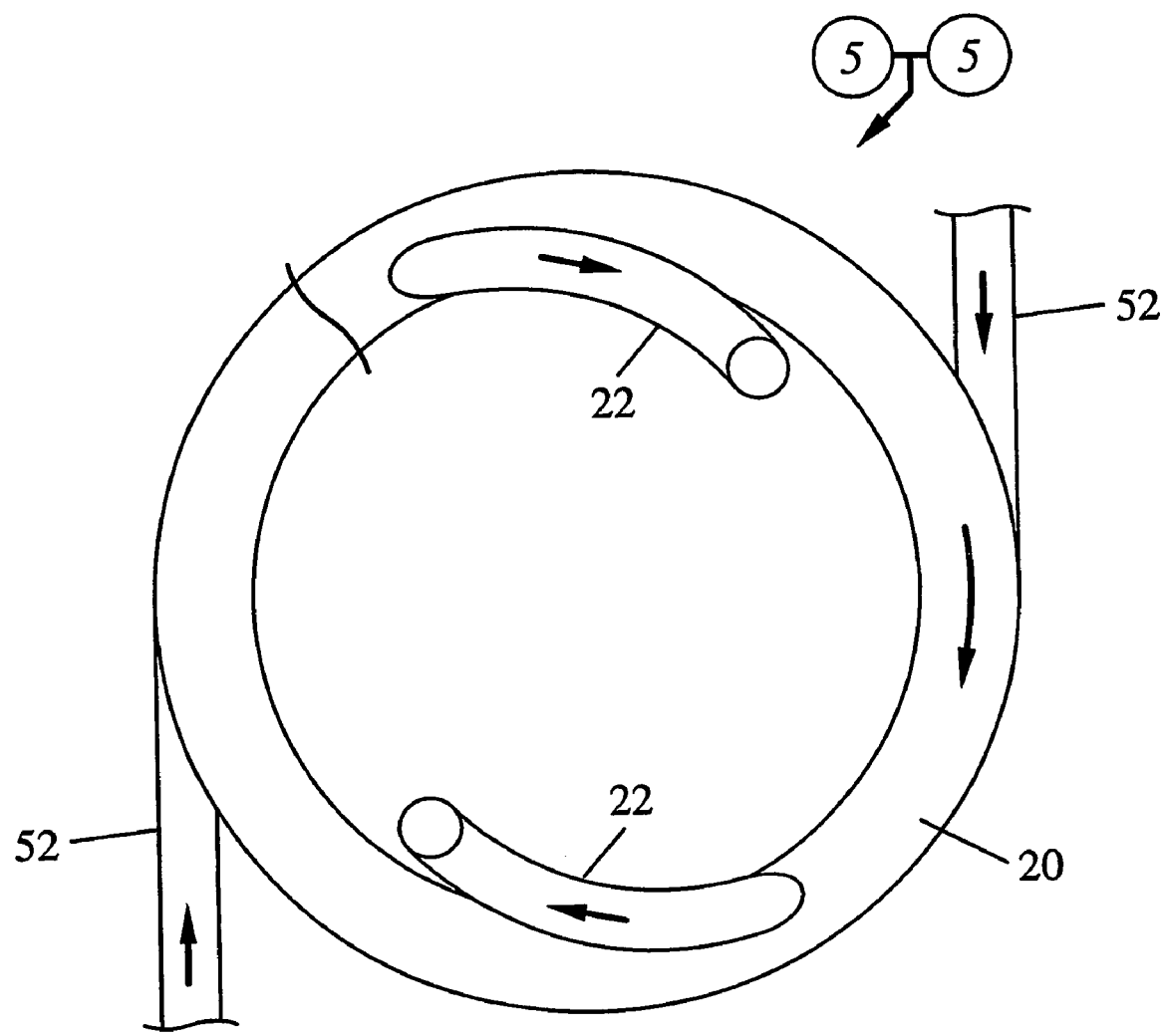
FIG. 9 is a plan view section of the loop of the conduit below the line 5-5 in FIGS. 2 to 4.

FIG. 9 is a plan view section of the beginning of the separation zone 16. Oil flow tubes 22 exit the spiral bore tangentially and sloping upwards from the inside top quarter of the bore 20. If the predominant liquid is oil, then water take off tubes should be fitted to the outer lower segment of the spiral bore. In this mode, sand and formation debris will also be in the water, thereby requiring a solids removal unit further down the water line.

Taking the spiral concept to mainly handle the water this allows the use of another set of exits 25 from the water containing tapered spiral section 16 for sand and formation debris removal in the form of a slurry, using the outer lower quarter exits, with dropping tangential connection leading to a solids disposal line 26.

The degree and level of separation of either the gas or water phases, is dependent on the number of spirals in separation zone 14 and 16 respectively. The quality of the separated oil is similarly dependent on the number of spirals in section 15. Because the oil is exiting in the mid-separation section 15, it still could contain small quantities of entrapped gas and water. These can be removed by now flowing the limited volume of oil compared with the original multiphase volume into a vertical oil separator 3 (FIG. 1) or into another toroidal separation assembly.

The flow of gas from 27, the water in line 24 and the oil from the system relative to the multiphase input flow must be controlled to ensure the gas/oil level 62 and the oil water 63 level remain relative constant. This is achieved by the use of flow control units (not shown) on lines 4, 64, 65 and 66 (FIG. 1) receiving the appropriate information from level sensor units 6 and 7.

The invention claimed is:

1. A separator for separating a multiphase fluid into selected lighter and heavier fluids, the separator comprising:
    a circular tubular having a downwardly facing outer section, an upwardly facing inner section, a tubular bore, and an inlet for the multiphase fluid to flow into the tubular bore; and
    the flow through the tubular bore causing the multiphase fluid to separate into selected lighter and heavier fluids, the circular tubular having a tangential outlet on the upwardly facing inner section in the direction of flow to separate selected lighter fluids and a tangential outlet on the downwardly facing outer section in the direction of flow to separate selected heavier fluids.

2. A separator according to claim 1, wherein the inlet is a tangential entry, thereby causing the fluid to circulate through the tubular bore.

3. A separator according to claim 1, wherein the flow area of the tubular bore diameter is at least twice the flow area of the inlet to allow a stable rotating flow.

4. A separator according to claim 1, further comprising another tubular located below, and in fluid communication with, the heavier fluid outlet, the another tubular causing further separation of the flow into lighter and heavier fluids and having an outlet for each of the lighter and heavier fluids.

5. A separator according to claim 4, wherein the inlet into the another tubular is tangential.

6. A separator according to claim 1, further comprising another tubular located above, and tangentially in fluid communication with, the lighter fluid outlet, the another tubular causing further separation of the flow into lighter and heavier fluids and having an outlet for each of the lighter and heavier fluids.

7. A separator according to claim 6, wherein the another tubular has tangential inlet.

8. A separator according to claim 1, further comprising a spiral conduit connected to at least one of the outlets, the spiral conduit having a smaller flow diameter than the circular tubular, thereby increasing the fluid velocity to enable further separation of the fluids into the selected lighter and heavier fluids.

9. A separator according to claim 8, wherein the spiral conduit includes a plurality of parallel coils having a common diameter to allow the flow to stabilize.

10. A separator according to claim 8, wherein the spiral conduit includes a plurality of tapered coils having consecutive reduced outer diameters.

11. A separator according to claim 8, wherein the bore diameter of the conduit is reduced in the direction of flow therethrough.

12. A separator according to claim 8, wherein the parallel and tapered coils have a slope at an angle to the circular tubular, the angle increasing as the fluid flows through the spiral conduit to control the flow from a previous coil.

13. A separator according to claim 8, further comprising one or more outlets from the spiral conduit to allow for the further separation of lighter and heavier fluids.

14. A separator according to claim 8, further comprising one or more drain and/or vent conduits communicating the spiral conduit with another tubular bore.

15. A separator according to claim 14, wherein the drain and/or vent conduits exit the spiral conduit tangentially and in the direction of flow to collect the selected lighter or heavier fluid.

16. A separator according to claim 1, further comprising a slurry outlet on the spiral conduit for the removal of a solid slurry.

17. A separator according to claim 1, wherein the circular tubular is substantially horizontal.

* * * * *